Oct. 22, 1940.                J. CARCHIDI                2,219,221

BELT TREAD FOR TRACTORS AND THE LIKE

Filed April 22, 1939

James Carchidi
INVENTOR.

BY C. A. Snowles
ATTORNEYS.

Patented Oct. 22, 1940

2,219,221

UNITED STATES PATENT OFFICE 2,219,221

BELT TREAD FOR TRACTORS AND THE LIKE

James Carchidi, Kingston, N. Y.

Application April 22, 1939, Serial No. 269,533

4 Claims. (Cl. 305—10)

This invention relates to a belt tread for tractors and the like of the "caterpillar" type, one of the objects being to provide a tread of this character having cushioning means combined with the links of the tread thereby to increase traction on certain surfaces, reduce noise, and provide a resilient armor for protecting the tread if subjected to gun-fire.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

Figure 1:
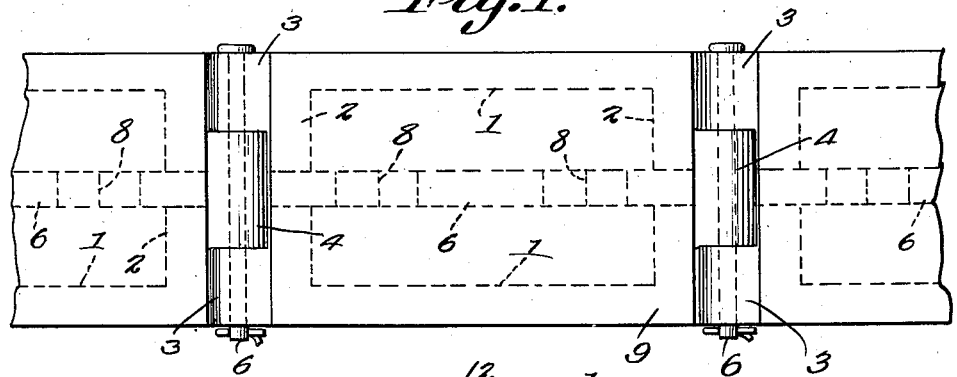
Figure 1 is a plan view of the outer or support engaging surface of a portion of the tread.
Figure 2:
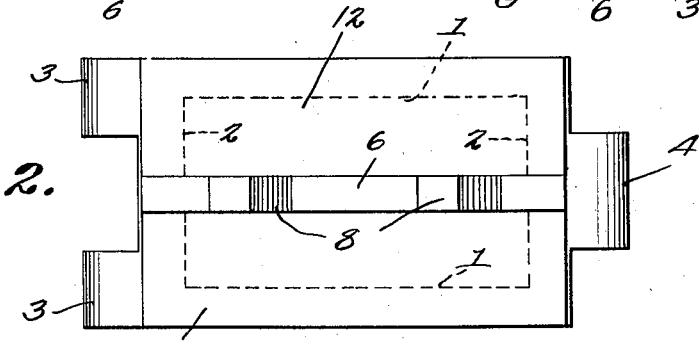
Figure 2 is a plan view showing the opposite side of one of the links of the tread.
Figure 3:
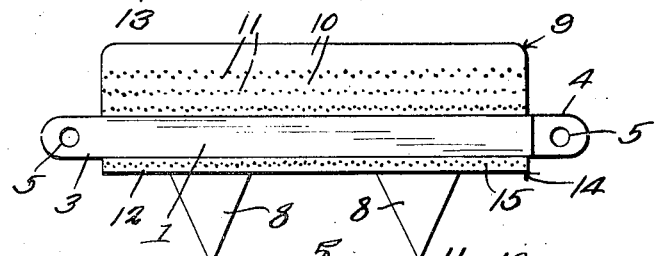
Figure 3 is a side elevation of the link.
Figure 4:
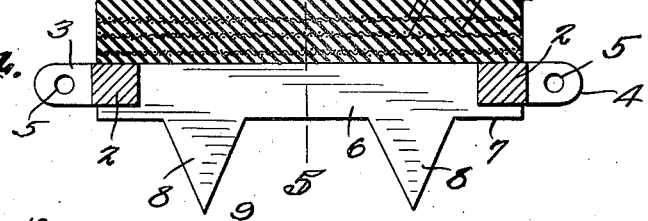
Figure 4 is a longitudinal section through the link.

Referring to the figures by characters of reference, 1 designates side bars connected at their ends by cross bars 2 formed integral therewith and from the ends of one of these cross bars are extended spaced ears 3 while from the central portion of the other cross bar is extended an ear 4 the links of which are substantially equal to the distance between the ears 3. These ears are all provided with transverse openings 5 for the reception of pivot pins 6 adapted to be held detachably in position by any suitable means.

The bars 1 and 2 are of the same thickness and constitute the sides and ends of a link frame.

Formed integral with this frame at the center thereof and extending longitudinally is an intermediate bar 6 the thickness of which is somewhat greater than that of the bars 1 and 2 so that one edge portion of bar 6 will extend outwardly from the link frame. This projecting portion which is indicated at 7, may be formed with one or more teeth 8 projecting therefrom and adapted to engage a sprocket or other driving element on which the tread is to be mounted.

Figure 5:
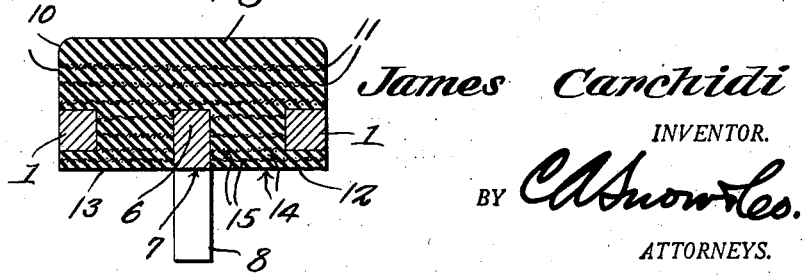
Figure 5 is a section on line 5—5, Figure 4.

Joined to the outer surface of the link is a cushion or pad 9 which can be formed of one or more alternating layers of rubber and metal fabric as indicated at 10 and 11 respectively, the parts of the pad being vulcanized together. On the other surface of the link are mounted pads 12 and 13 each of which is likewise formed of alternating layers of rubber and metal fabric or the like as shown at 14 and 15 respectively and these pads 12 and 13 overlie the side bars 1 and end bars 2 and abut against the projecting portion 7 of the intermediate bar 6. This is clearly shown in Figure 5. Thus the exposed surfaces of the pads 12 and 13 will be located at opposite sides of the teeth 8. Pads 12 and 13 extend into the spaces between the bars 1 and 6 and are joined to the pad 9 by vulcanizing it thereto. Thus when the parts are properly assembled a one-piece article is produced.

It has been found in practice that where the links of a belt tread are provided with pads or cushions herein described, the operation of the tread is rendered more efficient because of better traction produced, much of the noise is eliminated, and these pads or cushions likewise constitute resilient protectors for guarding the links against injury when subjected to gun-fire.

While metal fabric has been referred to as the reenforcing medium employed, it will be obvious that other means such as interlaced rods or the like could be used in lieu thereof. Obviously should the pad or cushion become worn excessively, it could readily be removed from the link and another supplied thereto and vulcanized for use as a substitute.

The number of teeth extending from the bar 6 will depend upon the size of the wheel engaged by the tread. Furthermore instead of employing one intermediate bar, it will be obvious that wide links could be formed with two or more of these bars. These modifications are so obvious that it is not deemed necessary to illustrate them.

What is claimed is:

1. A belt tread for tractors and the like including pivotally connected links, each link comprising integral side and end bars, an intermediate bar connecting the ends bars and projecting beyond one face thereof, a tooth extending from the intermediate bar for engagement by a driving element, and opposed pads overlying opposed faces of the side and end bars and joined at points between the bars, said intermediate bars being exposed throughout their lengths to provide a substantially continuous rail for the driving element.

2. A belt tread for tractors and the like including pivotally connected links, each link comprising integral side and end bars, an intermediate bar connecting the end bars and projecting beyond one face thereof, a tooth extending from the intermediate bar for engagement by a driving element, said intermediate bars being exposed throughout their lengths to provide a substantially continuous rail for the driving element, and opposed pads overlying opposed faces of the side and end bars and joined at points between the bars, each of said pads including alternate layers of rubber and reenforcing material joined by vulcanizing.

3. A belt tread for tractors and the like including pivotally connected links, each link comprising integral side and end bars, an intermediate bar integral with and connecting the end bars and projecting beyond one face of the end bars, means extending from the intermediate bar for engagement by an actuating element, spaced pads joined to one face of the link and abutting against opposed faces respectively of the intermediate bar, said tooth extending between the pads, said intermediate bars being exposed throughout their lengths to provide a substantially continuous rail for the driving element, and another pad joined to the opposed face of the link and to the first named pads.

4. A belt tread for tractors and the like including pivotally connected links, each link comprising integral side and end bars, an intermediate bar integral with and connecting the end bars and projecting beyond one face of the end bars, spaced pads joined to one face of the link and abutting against opposed faces respectively of the intermediate bar, said intermediate bar having an exposed face substantially flush with said abutting pads, teeth on the intermediate bar and extending between the pads, and another pad joined to the opposed face of the link and to the first named pads, each of said pads including alternately arranged layers of rubber and metal fabric vulcanized together.

JAMES CARCHIDI.